United States Patent [19]

Yonemori et al.

[11] Patent Number: 4,521,100

[45] Date of Patent: Jun. 4, 1985

[54] VARIABLE MAGNIFICATION IMAGE FORMING APPARATUS

[75] Inventors: Takaji Yonemori, Tokyo; Seiji Sagara, Yokohama, both of Japan

[73] Assignee: Canon Kabushiki Kaisha, Tokyo, Japan

[21] Appl. No.: 505,962

[22] Filed: Jun. 20, 1983

[30] Foreign Application Priority Data

Jun. 28, 1982 [JP] Japan .................. 57-111097
Jun. 28, 1982 [JP] Japan .................. 57-111099
Sep. 8, 1982 [JP] Japan .................. 57-157162

[51] Int. Cl.$^3$ ........................................ G03G 15/00
[52] U.S. Cl. ........................................ 355/8; 355/57
[58] Field of Search .......... 355/8, 14 R, 14 C, 55–57, 355/60, 66; 377/17

[56] References Cited

U.S. PATENT DOCUMENTS

| | | | |
|---|---|---|---|
| 3,873,189 | 3/1975 | Whitaker et al. | 350/255 |
| 4,077,710 | 3/1978 | Ward et al. | 355/3 R |
| 4,080,062 | 3/1978 | Torigari et al. | 355/49 |
| 4,322,159 | 3/1982 | Takahashi et al. | 355/57 |
| 4,323,308 | 4/1982 | Kitajima et al. | 355/8 X |
| 4,351,606 | 9/1982 | Franko | 355/55 X |
| 4,353,634 | 10/1982 | Himmelsbach | 354/195.1 |

FOREIGN PATENT DOCUMENTS 2016732A 9/1979 United Kingdom .
1594653 8/1981 United Kingdom .

*Primary Examiner*—A. T. Grimley
*Assistant Examiner*—J. Pendegrass
*Attorney, Agent, or Firm*—Fitzpatrick, Cella, Harper & Scinto

[57] ABSTRACT

Variable magnification copying apparatus wherein the optical element for forming an image of the original on a photosensitive member is displaceable for magnification change. The amount of displacement is controlled on the basis of the count of pulses generated by the pulse generator. The optical element is, as desired, restored to a reference position, and then moved to an object position by counting a predetermined number of pulses.

20 Claims, 24 Drawing Figures

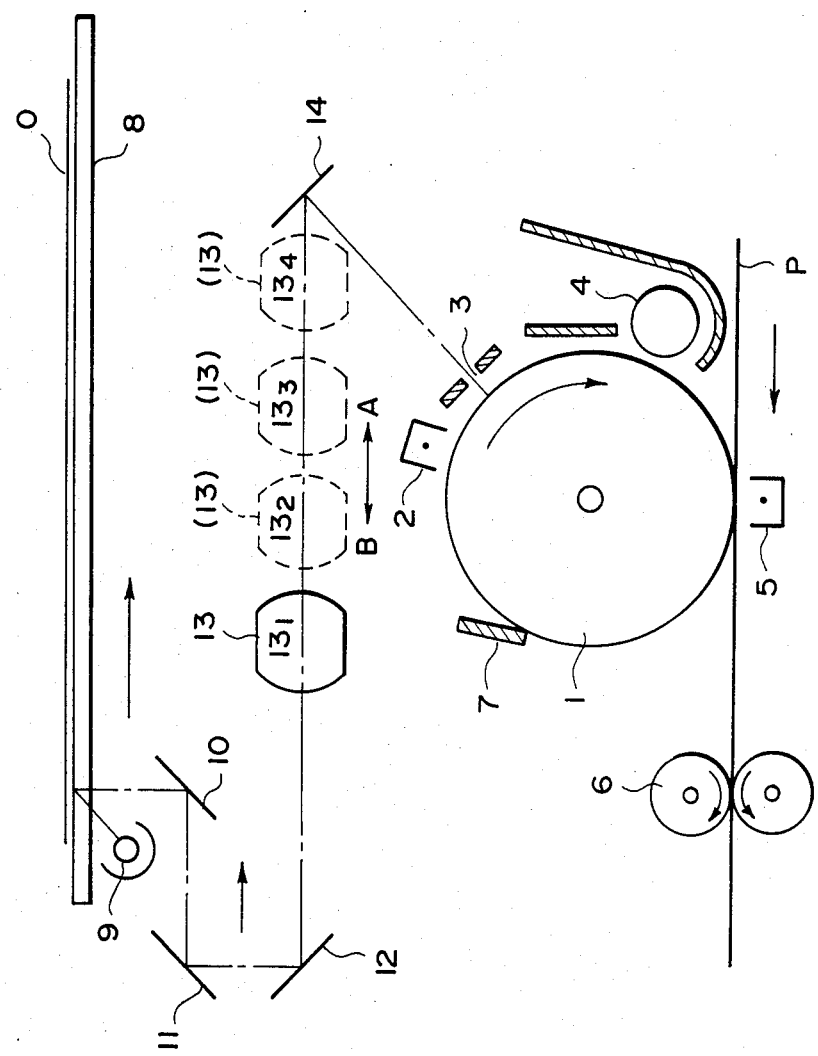
F I G. 1

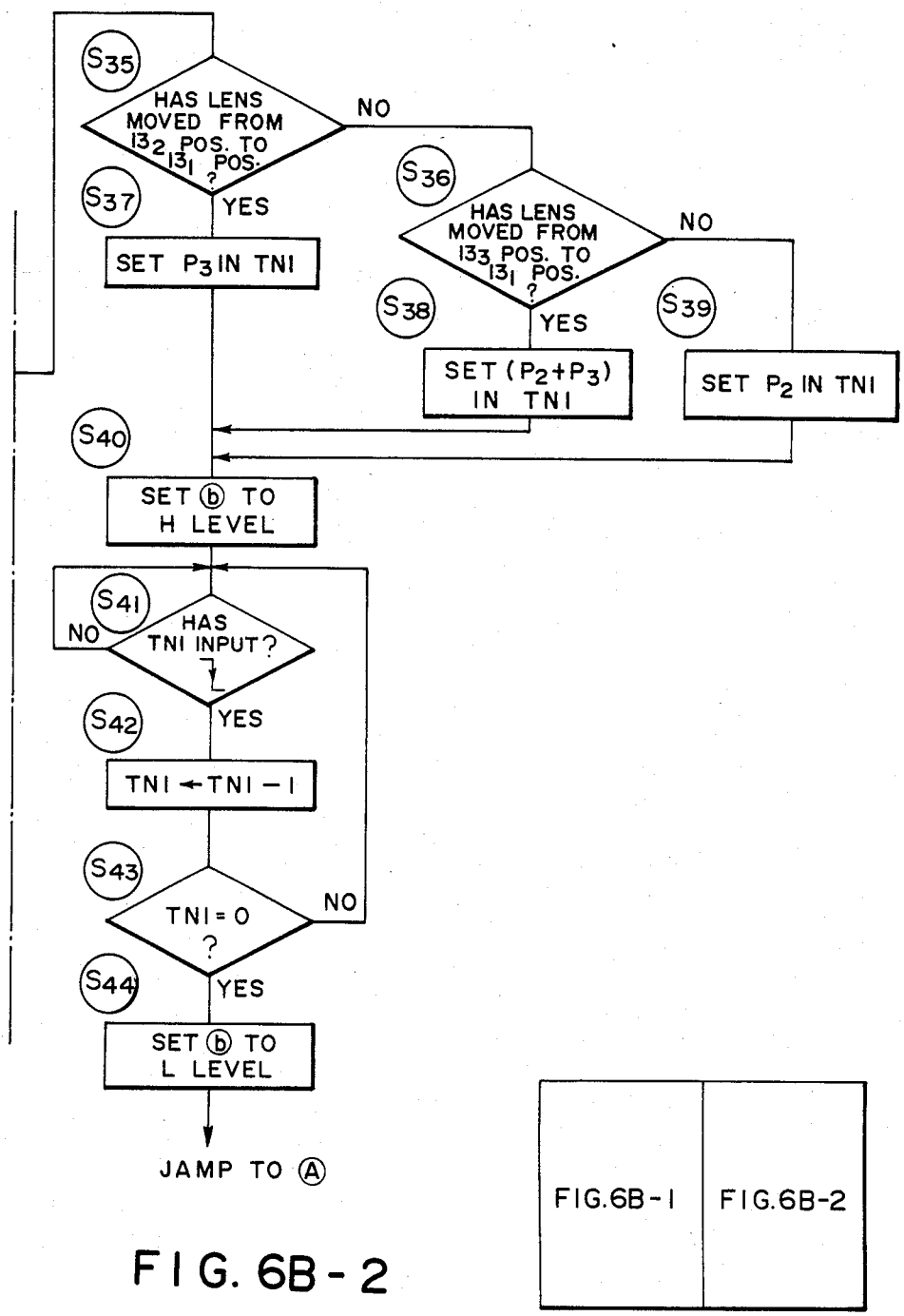

VARIABLE MAGNIFICATION IMAGE FORMING APPARATUS

BACKGROUND OF THE INVENTION

1. Field of the Invention

The present invention relates to an image forming apparatus capable of changing the magnification at which an image of an original is formed on a photosensitive member.

2. Description of the Prior Art

A variable magnification image forming apparatus, such as a variable magnification copying machine, is usually provided with lens means and mirrors for projecting an image of the original on the photosensitive member, which are displaceable to change the magnification at which the image of the original is formed.

Conventionally, plural stoppers are utilized to stop the optical elements selectively at one of several predetermined positions in dependence on the magnification selected. However, it is cumbersome to fix all of the stoppers at respective correct positions. Further, where numerous stop positions are required, or where the stop positions are substantially continuous, a number of, or a great number of stoppers must be used. It is difficult to arrange such numerous stoppers and correctly control the stopping positions.

To obviate those problems, it is good to control the amount of the optical element displacement on the basis of the count of the pulses which are generated as a series of pulses by a pulse generator.

However, there still remains a problem that, even if the driving means for the optical elements are stopped upon the count of the predetermined number of pulses, the optical elements are undesirably stopped at the positions deviated from the correct positions corresponding to the selected magnification, due to the inertia of the optical elements and/or due to non-uniform rotation or the like of the driving means resulting in the deviation between the count of the pulses and the extent of the rotation. The deviation will be integrated with the repeated magnification changes, so that the image is not formed at the selected magnification, or the sharpness of the image will become out of the tolerable range.

SUMMARY OF THE INVENTION

The principal object of the present invention is to provide a variable magnification image forming apparatus free from the above described disadvantages.

Another object of the present invention is to provide a variable magnification image forming apparatus wherein the optical elements are stopped, without difficulty, at respective correct positions corresponding to selected magnifications.

Further object of the present invention is to provide a variable magnification image forming apparatus wherein the optical elements are disposed to a position, using a count of the pulses, with increased accuracy.

Yet further object of the present invention is to provide a variable magnification image forming apparatus wherein the optical elements are displaced to a position, using a count of pulses, and wherein the possible integration of the error in the optical element positioning has been eliminated.

The above mentioned and other objects, features and advantages of the present invention will become more apparent by reference to the following description of the preferred embodiment of the invention taken in conjunction with the accompanying drawings.

BRIEF DESCRIPTION OF THE DRAWINGS

FIG. 1 shows a cross-section of an example of a variable magnification copying apparatus to which the present invention is applied;

FIGS. 6A, 6A-1, 6A-2, 6B, 6B-1, 6B-2 and 6C, 6C-1, 6C-2 are flow charts of the system used with the present invention;

FIGS. 7A, 7A-1, 7A-2, 7B, 7B-1, 7B-2 and 7C, 7C-1, 7C-2 are flow charts of another embodiment of the system used with the present invention.

DESCRIPTION OF THE PREFERRED EMBODIMENTS

Figures 2, 6A:
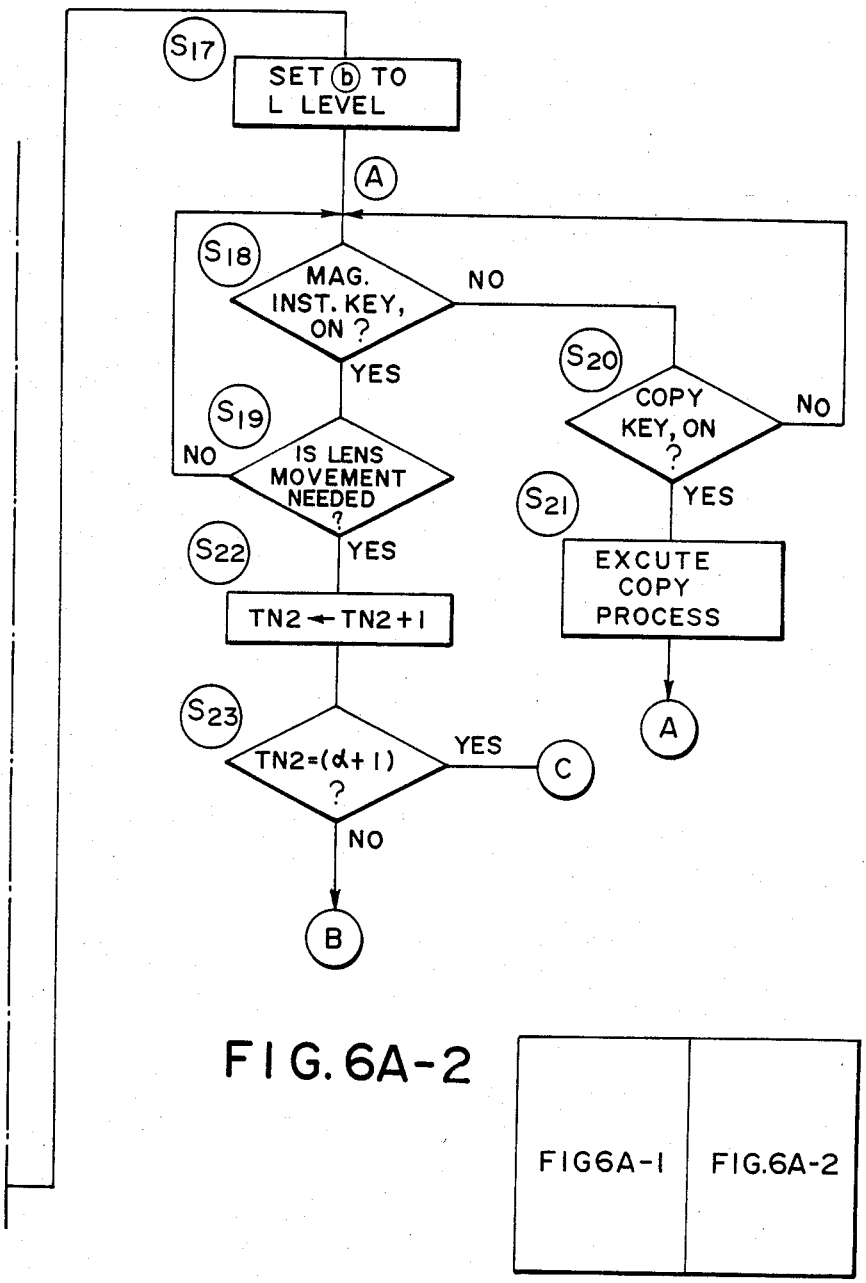
Figure 6A:
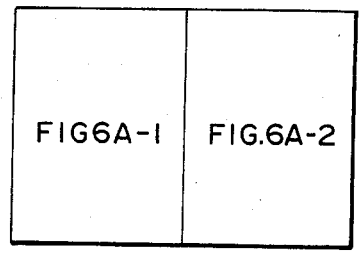
Figures 1, 6A:
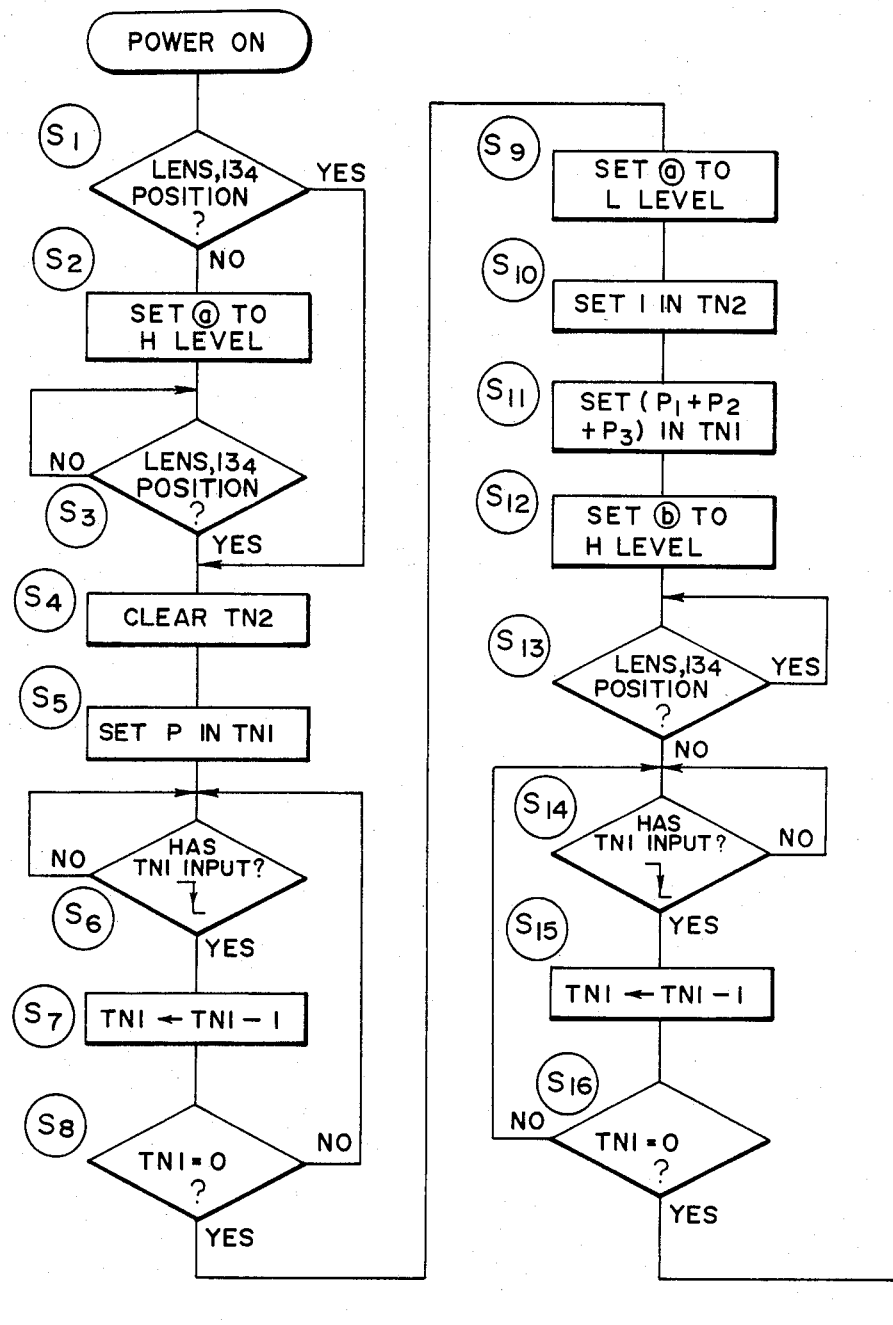

FIG. 1 shows an electrophotographic copying apparatus having a photosensitive drum 1 having on its surface an electrophotographic photosensitive member and rotatable in the direction shown by the arrow. The drum 1, with its rotation, is uniformly charged by a corona discharger 2 and exposed to a light image corresponding to the original O through a slit 3, the light images being formed at a selected magnification by optical elements which will be described hereinafter. By those steps an electrostatic latent image is formed on the photosensitive member of the drum 1, which is then developed by the developing means 4, so that a toner image is formed. The toner image is then transferred with the aid of the transfer discharger 5, to a transfer material or paper P which is being conveyed in the direction shown by the arrow. The transfer paper P is then transported to the fixing means 6 so that the toner image is fixed on the paper 6. The drum 1 from which the image has been transferred onto the transfer paper, is cleaned by the cleaning means 7, so that it can be repeatedly used.

The original O is placed face down on the transparent original table 8, through which the original is illuminated with a lamp 9. The light reflected by the original O is then reflected by the mirrors 10, 11 and 12 and directed to a zoom lens 13 which forms an image of the original via another mirror 14 on the photosensitive member of the photosensitive drum 1 at a selected magnification ratio. In the shown embodiment, the zoom lens 13 can take three positions, i.e., the position $13_1$ shown by solid lines, the position $13_2$ shown by broken lines and position $13_3$ shown by broken lines. The magnifications are $m_1$, $m_2$ and $m_3$, when the lens 13 assumes the positions $13_1$, $13_2$ and $13_3$, respectively, where $m_1$ is larger than $m_2$, which is larger than $m_3$. For the better understanding of the invention, the following description will be made as a case where $m_1$ equals 1. However, the present invention can be used with a machine having enlargement function, that is, $m_1 > 1$. The position shown by reference numeral $13_4$ is a reference position of the lens 13.

As will be described in detail hereinafter, when the lens 13 position changes, the zooming action takes place in response thereto so that the focal length of the zoom lens 13 is changed to a value corresponding to the new lens position, that is, the new magnification selected.

Next, the changes of the focal length and the optical paths will be explained using the formula for thin lenses. They are required to satisfy the following equations:

$$l_1 = l/(m+1)$$

$$l_2 = ml/(m+1)$$

$$f = ml/(m+1)^2$$

Where $l_1$ is optical path length between the original and the lens 13, $l_2$ (l is optical path length between the lens and the photosensitive member, l is the sum of $l_1$ and $l_2$ (l is constant), m is the selected magnification), f is the focal length of the lens 13. So, the lens position and the lens focal length are changed so as to satisfy the above equations in response to the magnification selected.

The apparatus shown in FIG. 1 is of an original scanning type. The mirror 10, together with lamp 9, moves forwardly and parallel to the original table as shown by the arrow, and mirrors 11 and 12 move in the direction shown by the arrow at the speed which is one half of the mirror 10 speed to maintain the constant optical length between the original and the lens. With those movements, the original O is scanned, and the image of the original is projected onto the photosensitive drum 1 through the slit. When the scanning action completes, the members 9–12 move backwardly to their home positions. The speed of the mirror 10 and lamp 9 in the forward movement is 1/m of the drum 1 peripheral speed to make the magnification in the direction of drum circumference equal m, when the copy magnification is m.

Figure 2:
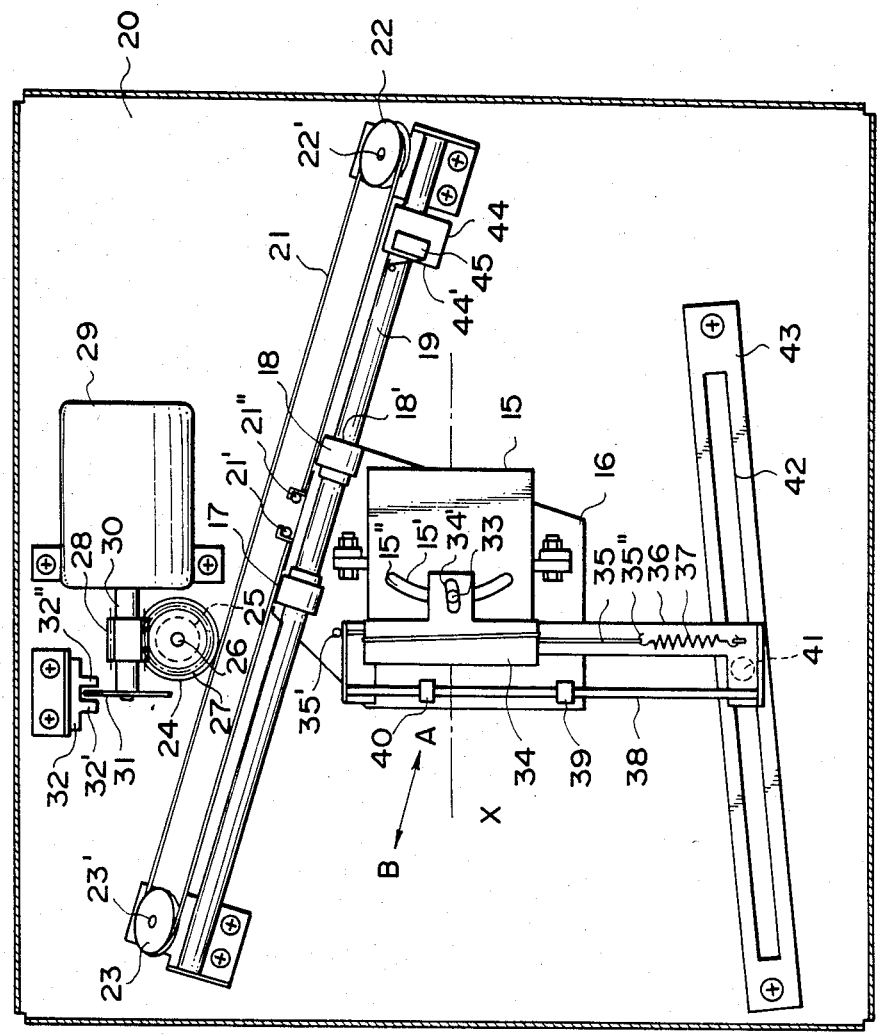
FIG. 2 is a front view of an example of a driving mechanism for a zoom lens.

FIG. 2 shows the mechanism for the lens 13 movement and the zooming for the same. The zoom lens 13 is contained in the lens barrel 15, which is fixed on the lens mount 16, which has a sliding bearings fixed thereto. The bearings 17 and 18 are slidably engaged with a rectilinear guide rail 19 fixed on a base plate 20. Therefore, the lens mount 16 carrying the lens 13 is slidable along the guide rail 19 in the directions shown by the arrows A and B. The rail 19 extends inclinedly with respect to the optical axis X of the lens 13, so that the direction of the lens movement is also inclined with respect thereto. This is done in order to allow the originals to be so placed that their edges are set at a reference position on the original table irrespective of the magnifications without changing the position, on the photosensitive drum 1, of the images of the edges despite the magnification change. For such a type that the originals are placed at the center of the original table irrespective of the magnification, and the images of the original are formed at the center of the photosensitive drum for all magnifications, the rail 19 extends parallel with the optical axis X.

Figure 4:
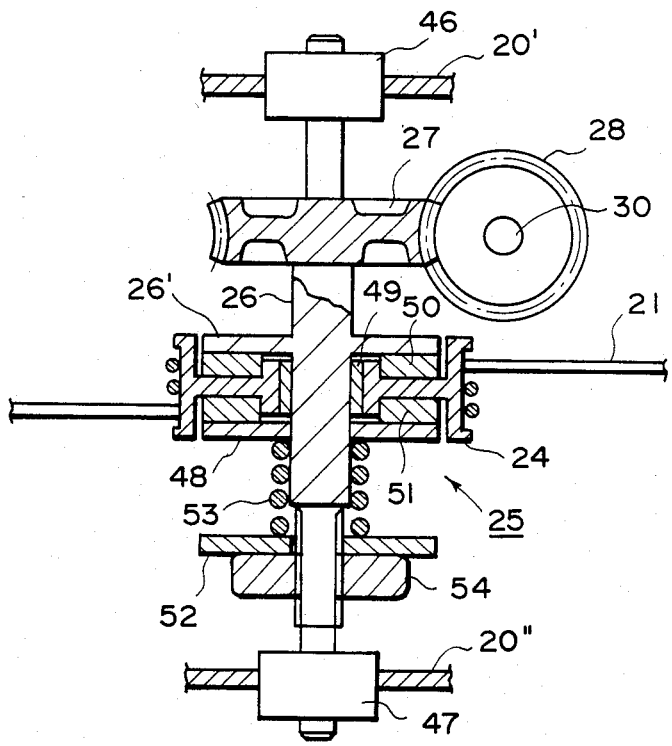
FIG. 4 is a partly cross-sectional view of a torque limiter used with the present invention.

To the lens mount 16, opposite ends 21' and 21" of the wire 21 are fixed. The wire 21 is entrained about the pulleys 22 and 23 rotatably supported on the shafts 22' and 23' which are fixed on the base plate 20, and it is further entrained plural turns about the driving pulley 24. The driving pulley 24 is connected to a shaft 26 through a torque limiter 25, an example of which is shown in FIG. 4. Depicted at 27 is a worm wheel fixed to the shaft 26. The worm wheel 27 meshes with the worm gear 28 fixed to the output shaft 30 of the motor 29. When the motor 29 drives forwardly, the shaft 26 rotates clockwisely by the worm gear 28 and worm wheel 27. Through the torque limiter 25 connecting the shaft 26 and the pulley 24, the pulley 24 rotates clockwisely to move the lens mount 16 carrying the lens 13 in the direction shown by the arrow A through the wire 21.

The motor 29 output shaft 30 has a disk 31 fixed thereto so that the disk 31 rotates together with the shaft 26. So, when the torque limiter 25 connecting the shaft 26 and the pulley 24 rotates, the disk 31 rotates in synchronism with the movement of the lens mount 16.

Figure 3:
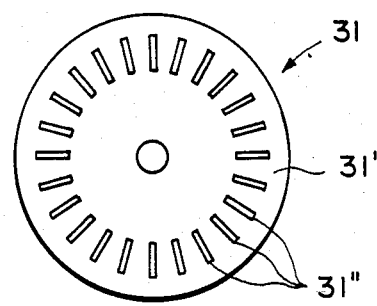
FIG. 3 is a front view of a part of an example of a pulse generator.

The disk 31, as shown in FIG. 3, is formed by a non-transparent disk 31' in which is formed a number of light passing slits 31" at regular circumferential intervals. Depicted at 32 is a photocoupler fixed on the base plate 20. The light emitting part 32' and the light receiving part 32" of the photocoupler are so disposed that the slit part of the disk 31 is interposed therebetween. Therefore, with the rotation of the disk 31 by the motor 29, the light emitted by the light emitting part 32" of the photocoupler periodically passes through the slit 31", so that the light receiving part 32" of the photocoupler 32 generates periodical electric pulses. The rotation angle of the shaft 26 corresponding to a term of the pulses is constant, so that the number of the pulses exactly corresponds to the amount of movement of the lens mount 16 carrying the lens 13. Upon the magnification change, i.e., the lens 13 position change, the operation of the motor 29 starts the movement of the lens 13, and in synchronism therewith, the pulses generate. As will be described in detail hereinafter, the number of the pulses is counted, and the motor 29 is deenergized to stop the lens 13, when the number of pulses corresponding to the selected magnification is counted. Thus, the lens 13 is displaced by the amount corresponding to the selected magnification.

The lens 13 is a zoom lens, as described hereinbefore, and in FIG. 2 embodiment, the zooming action is effected in synchronism with the lens displacement. For this purpose, the lens barrel 15 is provided with a cam slot 15', into which a pin 33 is engaged, which is fixed to the lens holder 15" for the focal length changing lens which is rotatable about the lens axis within the lens barrel and slidable along the lens axis relative to the lens barrel 15. The lens barrel 15 has a zooming ring 34 which is rotatable about the lens axis X, but not slidable along the lens axis relative to the lens barrel. The zooming ring 34 has an elongate slot 34' into which said pin 33 is engaged, so that the rotation of the zooming ring 34 moves the pin 33 along the cam slot 15', resulting in the change in the spaces among predetermined lens elements within the lens barrel 15 to change the focal length of the lens.

The mechanism of rotating the zooming ring 34 will now be described. About the zooming ring 34, the wire 35 is entrained one or more turns. One end 35' of the wire 35 is connected to an end of a wire supporting member 36 which is slidably mounted on the lens mount 16. The other end 35" of the wire 35 is connected to the other end of the wire supporting member 36 through a tension spring which prevents slackness of the wire 35. The wire supporting member 36 has a linear guide rod 38 extending in a direction not parallel with the optical axis X, for example, in the direction perpendicular to the optical axis. The guide rod 38 is slidably inserted in the slide bearings 39 and 40 fixed on the lens mount 16.

Therefore, the wire supporting member 36 moves relative to lens mount 16 in the direction perpendicular to the optical axis X. The relative movement drives the wire 35 to rotate the zooming ring 34. The wire supporting member 36 has a cam follower 41 fixed thereto, which is engaged into an elongate rectilinear cam slot 42 formed in the cam plate 43 fixed on the base plate 20 and extending inclinedly with respect to the lens movement. The above mentioned movement of the lens mount 16 carrying the lens 13, provides the above described relative movement of the wire supporting member 36 operatively connecting the cam 42 and the zooming ring 34, with respect to the lens mount 16 with the confinement of the cam 42, so that the zooming lens 34 rotates, thus changing the focal length of the lens 13. The amount of the lens movement and the focal length change are thus made to correspond each other. The contour and orientation of each of cams $15'$ and $24'$ is so determined that the above stated three equations are satisfied. In other words, when the lens 13 is moved to a position for a selected magnification, the focal length of the lens 13 is changed to the value which corresponds to the selected magnification.

The base plate 20 is provided with a stopper 44 fixed thereto. In FIG. 2 embodiment, the stopper 44 is located at an end of the lens 13 movement passage. When the lens mount 16 moves in the direction shown by the arrow A to the end of the movement path, the side surface $18'$ of the bearing 18 abuts the side surface $44'$ of the stopper 44, so that the further movement of the lens 13 movement in the direction of the arrow A is prevented. The position of the lens mount 16 where the bearing 18 of the lens mount 16 abuts the stopper 44, is the reference position of the lens mount 16, or the position of the lens 13 at this state is the reference position of the lens 13 (the position shown by reference numeral $13_4$ in FIG. 1). On the stopper 44, a microswitch 45 is fixed which functions as lens position detecting means. When the bearing 18 abuts the stopper 44, the side surface $18'$ of the bearing 18 abuts an actuator of the microswitch 45. That is, when the lens mount 16 reaches the reference position, namely, when the lens 13 reaches the lens reference position $13_4$, said microswitch produces a signal.

When the motor 29 is energized to drive forwardly the lens 13, in the direction of arrow A, the microswitch 45 generates a signal at a certain point of time. The signal means that the lens 13 has reached the reference position $13_4$. If the motor is deenergized instantaneously upon the generation of the signal, the lens 13 possibly stops at a position deviated from the reference position. This may be caused by the possible error in the positioning of the switch 45, the possible error in the operation timing of the switch 45 or the possible displacement of the lens mount 16, in the direction of arrow B, which may be caused by the reaction at the time of the bumping between the bearing 18 and the stopper 44. In any event, when the lens 13 stops at an incorrect position, the subsequent displacement of the lens 13 through the amount corresponding to the number of pulses which, in turn, corresponds to the selected magnification, will result in an incorrect positioning, again, of the lens 13, that is, the lens 13 will be deviated from the position $13_1$, $13_2$ or $13_3$, so that an image at the desired magnification cannot be provided.

To avoid this problem, the FIG. 2 embodiment uses a torque limiter 25 in the driving force transmitting path. The motor 29 continues to be energized a little while after the microswitch 45 generates the signal, that is, after the lens 13 is supposed to reach the reference position $13_4$, thereby to ensure that the bearing 18 is urged to the stopper 44. The lens 13 is stopped exactly at the reference position $13_4$, since the motor 29 is deenergized to stop the force applied to the lens 13 toward the reference position, only after the lens 13 has reached the reference position $13_4$ so that the lens mount 16 abuts the stopper 14.

As means for detecting the position of the lens 13, there are other possible elements, such as a combination of a magnet and a hall element provided on the lens mount 16 and stopper 44, respectively, or vice versa. The signal produced at the time of the magnet facing the hall element can be used as a signal produced by the microswitch 45.

FIG. 4 illustrates an example of a torque limiter. The shaft 26 to which the worm wheel 27 is secured, rotatably supported by the bearings 46 and 47 which are fixed to stays $20'$ and $20''$ secured to the base plate 20. The shaft 26 is provided with a flange $26'$, which is integral with or fixed to the shaft 26. To the shaft 26 a disk 48 with a hole is loosely fitted. Spacers 49, 50 and 51 are interposed between the base portion of the pulley 24 and the shaft 26, flange $26'$ and the disk 48, respectively. Between the disk 48 and another disk 52 with a hole which is also loosely fitted around the shaft 26, a compressed spring 53 is provided. Depicted at 54 is a nut, threaded on the screw mounted on the shaft 26, for receiving the disk 52. The pressure given to the disk 48 can be controlled by the nut 54. The resilient force of the spring 53 urges the disk 48 and the spacer 51 to each other, the spacer 51 and the base portion of the pulley 24 to each other, the base portion of the pulley 24 and the spacer 50 with each other, and the spacer 50 and the flange $26'$ to each other. The shaft 26 and the pulley 24 are connected, unless the wire 21 receives a load larger than a predetermined, so that the rotation of the worm wheel 27 rotates the pulley 24 and the shaft 26 as a unit to move the lens 13 in the direction of arrow A or B. If the motor 29 continues to be energized after the bearing 18 of the lens mount 16 abuts the stopper 14, that is, the lens 13 is made to be moved further in the direction of the arrow A, the wire 21 is given a load which is beyond the above predetermined, the sliding takes place between the spacer 49 and the shaft, between the spacer 50 and the flange $26'$, and between the spacer 51 and the disk 48, so that the pulley 24 stops with the worm wheel 27 and the shaft 26 rotating idly as a unit, that is, the motor 29 rotates idly. This ensures the positioning of the lens 13 to the reference position $13_4$. The torque limiter 25 may be omitted, if other mechanisms for ensuring the correct positioning of the lens position detecting means and ensuring no reaction displacement between the lens mount 16 and the stopper 44 at the time of their bumping with each other. In such a case, the application of the driving force to the lens mount 16 is stopped instantaneously upon the generation of microswitch 45 signal.

Figure 5:
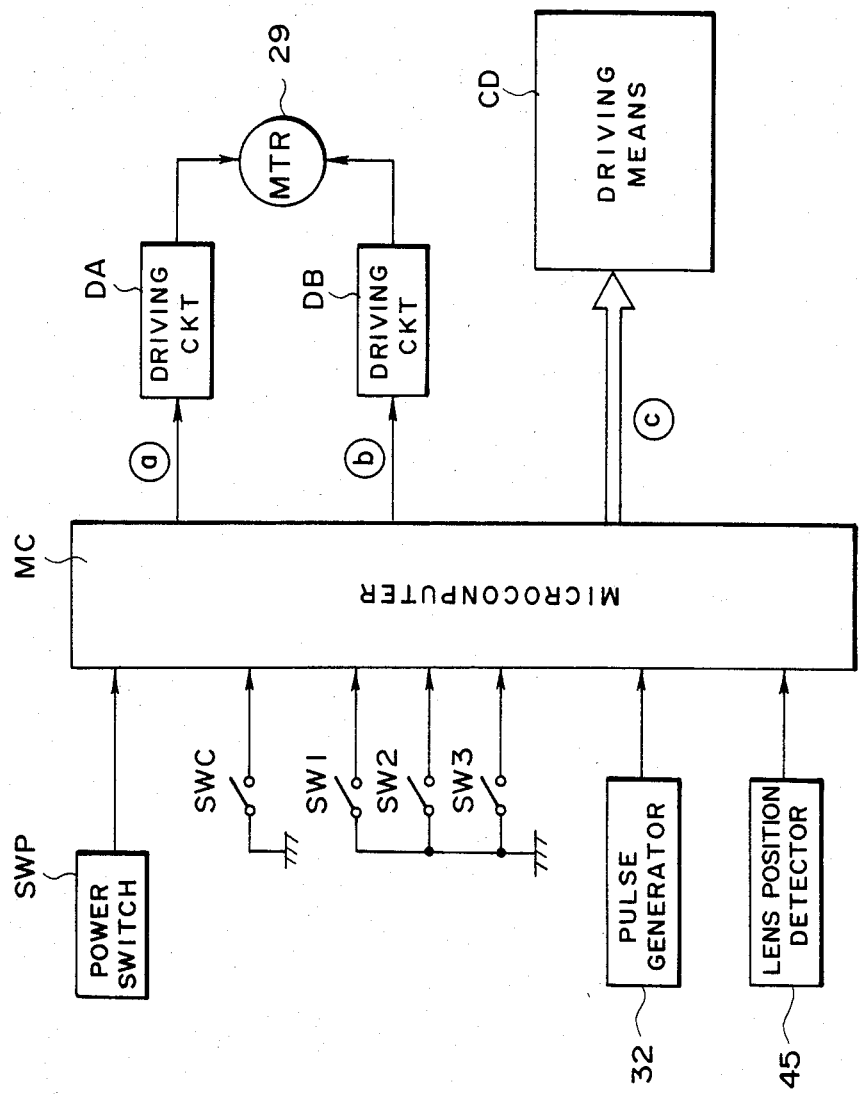
FIG. 5 is a block diagram of a control system used with the present invention.

The operation of the above-described mechanism will now be explained. For the control of the mechanism a microcomputer is utilized. As shown in FIG. 5, a one-chip microcomputer MC receives signals from copy instruction key SWC, $m_1$ magnification setting key SW1, $m_2$ magnification setting key SW2, $m_3$ magnification setting key SW3, pulse generator 32 and lens position detector 45. Also, the microcomputer MC detects the actuation of the power switch SWP. The microcomputer MC outputs a signal ⓐ for energizing the driving circuit DA for the forward drive of the motor 29, a signal ⓑ for energizing the driving circuit DB for the backward drive of the motor 29, and signals ⓒ for executing the copying process. When the signal ⓐ is at the H level, the circuit DA is energized so that the lens 13 moves in the direction of the arrow A, as shown in FIG. 2. When the signal ⓑ is at the H level, the circuit DB is energized so that the lens 13 moves in the direction of arrow B. The circuits DA and DB are not energized, respectively when the signal ⓐ is at the low level, and when the signal ⓑ is at the low level. When the signal ⓒ outputs, the driving circuits for the photosensitive drum 1, chargers 2 and 5, developing means 4, fixing means 6, lamp 9, mirrors 10, 11 and 12, transporting means for the paper P (the driving means for all of the above is, as a whole, called, hereinafter as driving circuit CD), are actuated under a predetermined sequence to execute the copying process described hereinbefore in conjunction with FIG. 1, so that an image, at a selected magnification, of the original is formed on the paper P. The sequence for such image formation may be of the type which is known, so that the detailed description of the sequence is omitted for the simplicity of explanation.

The microcomputer MC has a counter (TN1) function to count the pulses generated by the pulse generator 32, and a counter (TN2) function to count the number of the displacements of the lens 13 executed.

Figure 8:
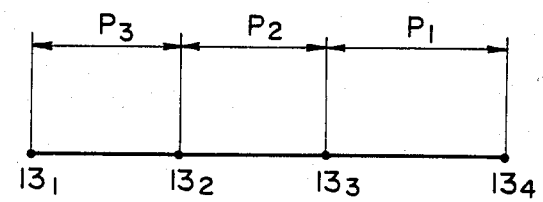
FIG. 8 is an illustration showing the relationship between the number of pulses and the amount of the lens displacement.

As shown in FIG. 8, the pulse generator 32 produces $P_1$ pulses, correspondingly to the lens 13 moving from the reference position $13_4$ to the position $13_3$ for the magnification $m_3$; $P_2$ pulses, correspondingly to the lens 13 moving from the position $13_3$ to the position $13_2$ for the magnification $m_2$; and $P_3$ pulses, correspondingly to the lens 13 moving from the position $13_2$ to the position $13_1$ for the magnification $m_1$.

Figures 1, 6B:
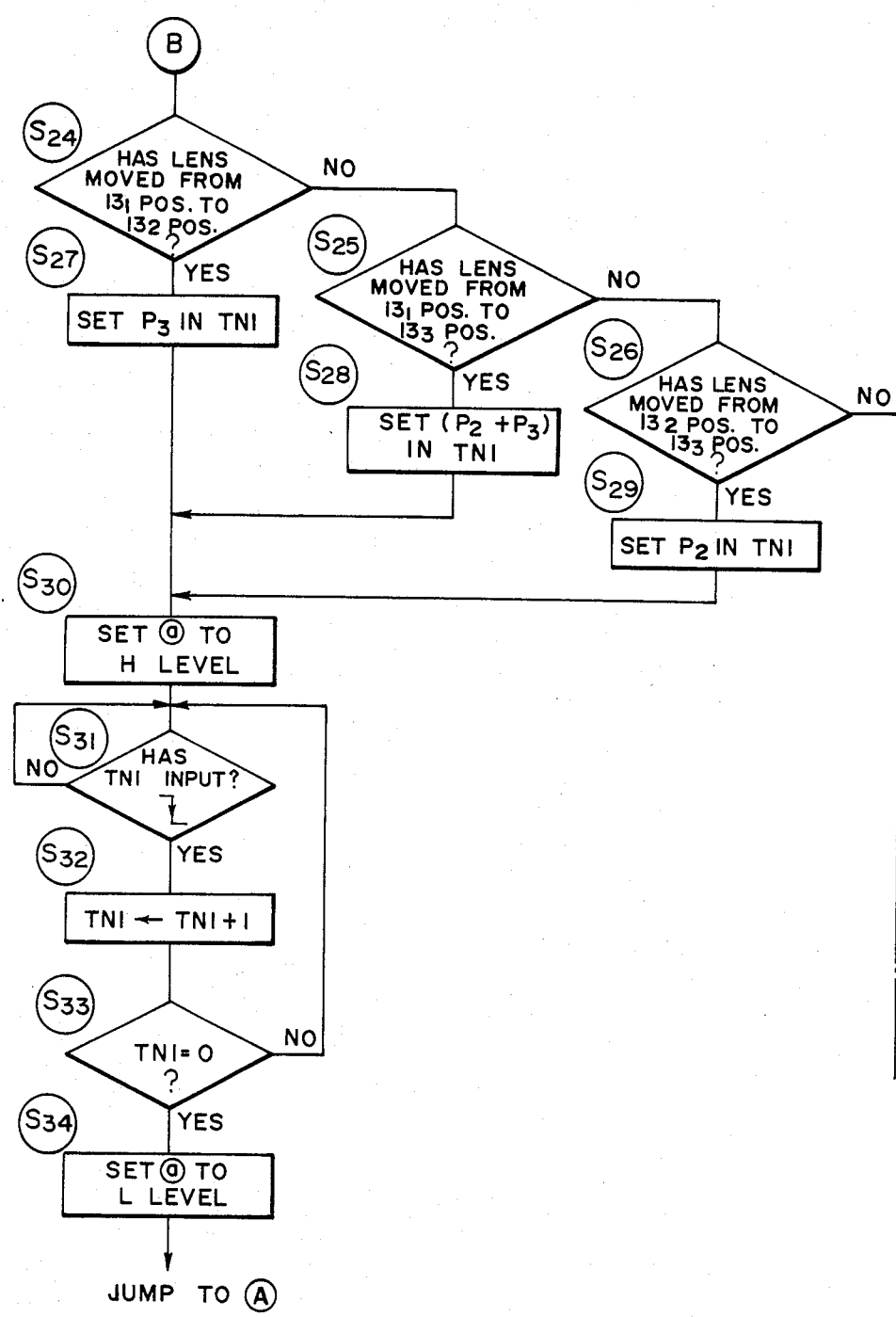
Figures 2, 6C:
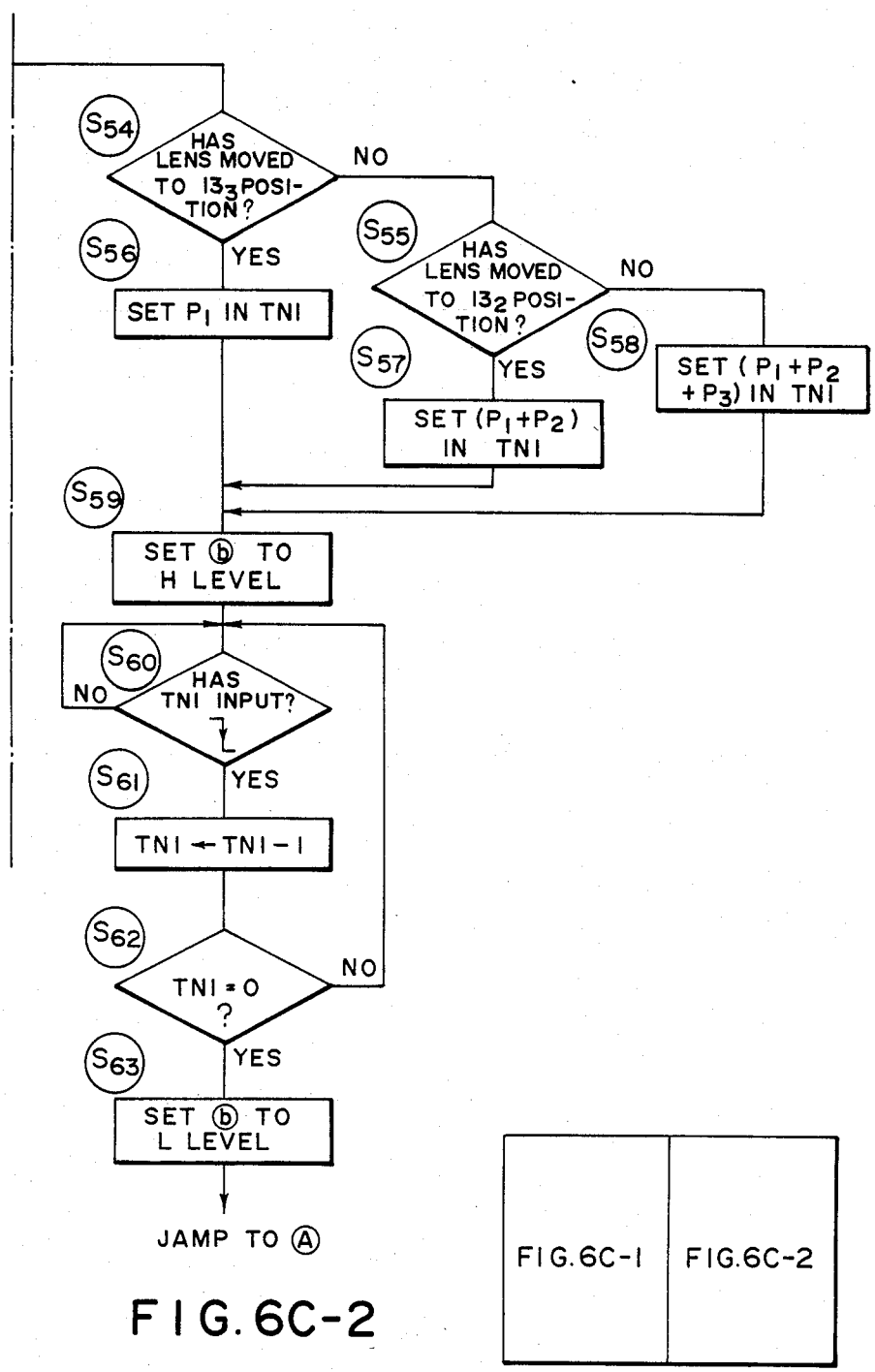
Figures 1, 6C:
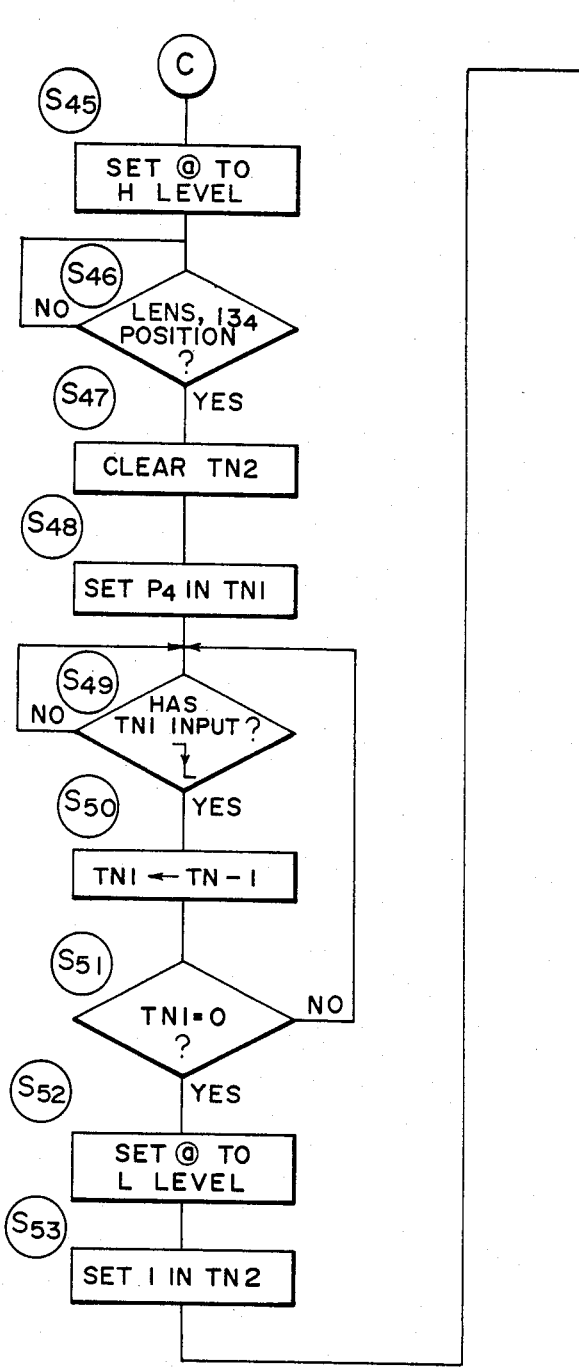

FIGS. 6A, 6B and 6C show flow charts of the control software of the microcomputer MC. In FIG. 6A, upon the actuation of the power switch SWP to supply power to the copying machine (POWER ON), the microcomputer MC determines whether the lens 13 is at the reference position $13_4$ (step $S_1$), on the basis of the presence or absence of the signal of the microswitch 45. If so, step $S_4$ is executed, but, if not, the signal ⓐ is set to H level (step $S_2$) to move the lens 13 in the direction of arrow A. The arrival of the lens 13 at the reference position $13_4$ is detected by the microswitch 45 (step $S_3$), and then the counter TN2 is cleared (step $S_4$), and then the count pulse number $P_4$ is set in the counter TN1 at the step $S_5$. By these steps, the motor 29 continues the forward drive for the time period corresponding to $P_4$ pulses, after the bearing 18 acts on the microswitch 45, that is, the bearing 18 abuts the stopper 44, thus ensuring the correct positioning of the lens 13 at the reference position $13_4$. Therefore, the number $P_4$ is not necessarily be large, and may be made as small as possible provided that the correct positioning of the lens 13 is ensured. After the step $S_5$, a determination is made as to whether the counter TN1 receives the pulses from the pulse generator 32 (step $S_6$), and the counter TN1 is decremented by one each time it receives the pulse (step $S_7$). At step $S_8$, a determination is made as to whether TN1 equals zero, that is, whether the time corresponding to $P_4$ pulses has elapsed from the generation of the microswitch signal 45. If so, the signal ⓐ is set to L level to stop the motor 29 (step $S_9$). Next, at step $S_{10}$, the counter TN2 is set to one. The counter TN2 is to count how many times the lens 13 is moved to and positioned at the position $13_1$, $13_2$ or $13_3$ (that is, the lens position at which the copy process is executed). When the number reaches a predetermined number α, the lens 13 is once restored to the reference position $13_4$, and then moved to the position $13_1$, $13_2$ or $13_3$ in accordance with the magnification selected. The number α is predetermined, such as five, which is determined in dependence of the desired accuracy of the magnification and the error in positioning. In this embodiment, the counter TN2 counts by one, before the lens 13 is actually moved to the position $13_1$, $13_2$ or $13_3$. After the step $S_{10}$, the counter TN1 is set to the number $(P_1+P_2+P_3)$ which corresponds to the movement from the reference position $13_4$ to the position $13_1$ which corresponds to the unit magnification, that is, one-to-one copy. At the next step $S_{12}$, the signal ⓑ is set to H level to start the movement of the lens 13 from the reference position $13_4$ in the direction of arrow B. A discrimination is made, at step $S_{13}$, as to whether the lens 13 is at the position $13_4$, and then, at step $S_{14}$, a discrimination is made as to whether the counter TN1 receives the signal from the pulse generator 32. If so, the counter TN1 is decremented at step $S_{15}$, and it is determined whether the number $(P_1+P_2+P_3)$ has been counted up at step $S_{16}$. If so, that is, TN1=0, the lens 13 has reached the position $13_1$, the signal ⓑ is set to L level to stop the motor 29, thus stopping the lens movement.

Thus, when the copying machine is supplied with power by closing the power switch SWP, the lens 13 is, at first, positioned at the reference position $13_4$, and then, it is moved therefrom to the unit magnification position $13_1$. Therefore, an image of the original at correctly unit magnification is formed, upon the subsequent actuation of the copy key SWC. Since the one-to-one copy is most frequently used, it is convenient to firstly set the lens 13 to the unit magnification position in response to the actuation of the power switch SWP.

The operator will depress a desired magnification key, among keys SW1, SW2 and SW3. The microcomputer, at step $S_{18}$, determines whether a magnification selector key is actuated. If not, step $S_{20}$ which will be described hereinafter, is executed. If so, a determination is made as to whether the current position of the lens 13 is the position corresponding to the selected magnification, that is, whether the lens displacement is necessary, at step $S_{19}$. If not, step $S_{18}$ is executed, where a determination is made again as to whether the magnification selector key is actuated. Before this, the input information has been used for the determination and has been erased, the determination should "NO", so that step $S_{20}$ is executed. At the step $S_{20}$, it is determined whether the copy key SWC has been actuated. If so, the copying process described hereinbefore is executed by the signal c , but if not, the step $S_{18}$ is repeated. Therefore, the steps $S_{18}$ and $S_{20}$ are repeated until the copy key SWC or the magnification selector key is actuated.

If the lens 13 displacement is determined as being necessary at the step $S_{19}$, the counter TN2 is incremented at step $S_{22}$, and then, at step $S_{23}$, a determination is made whether the count reaches $(α+1)$. If so, that is, TN2=$(α+1)$, it means that the number of the lens 13 displacement to the position $13_1$, $13_2$ or $13_3$ upto this point of time is already α, so that a system ⓒ shown in FIG. 6C is executed. That is, the lens 13 is once moved to the reference position $13_4$, and then moved to the position corresponding to the selected magnification. But, if the determination at step $S_{23}$ is negative, the sequence goes to step $S_{24}$, where a determination is made as to whether the lens 13 is to be moved from $13_1$ position to $13_2$ position. If not, it is determined as to whether to move the lens 13 from the position $13_1$ to the position $13_3$, at step $S_{25}$. If not, a further discrimination is made as to whether to move the lens 13 to the position $13_2$ to the position $13_3$, at step $S_{26}$. The steps $S_{24}$, $S_{25}$ and $S_{26}$ are all concerned with the determination as to the movement in the direction of arrow A. If the determination at step $S_{24}$, step $S_{25}$ and step $S_{26}$, the counter TN1 is set to $P_3$, $(P_3+P_2)$ and $P_2$, respectively, at step $S_{27}$, step $S_{28}$ and step $S_{29}$, respectively.

At step $S_{30}$, the signal ⓐ is set to H level to move the lens 13 from the current position in the direction of arrow A. Similarly to steps $S_6$, $S_7$, $S_8$ and $S_9$, the lens 13 is displaced through the amount corresponding to the number of pulses set in the counter TN1, at steps $S_{31}$, $S_{32}$, $S_{33}$ and $S_{34}$. Thus, the lens 13 is positioned at the position for the magnification selected. At the termination of those steps, the sequence jumps to Ⓐ of FIG. 6A.

If the determination at the step $S_{26}$ is "NO", the lens 13 has to be moved in the direction of arrow B. At step $S_{35}$, it is determined whether the lens 13 is to be moved from the position $13_2$ to the position $13_1$. If not, at step $S_{26}$, a determination is made as to whether to move the lens 13 from the position $13_3$ to the position $13_1$. If not, it is necessary to move the lens 13 from the position $13_3$ to the position $13_2$, so that the counter TN1 is set to $P_2$, at step $S_{39}$. If the determination at step $S_{35}$ and step $S_{36}$ is "YES", the counter TN1 is set to $P_3$ and $(P_2+P_3)$, respectively (step $S_{37}$ and $S_{38}$). Then, at step $S_{40}$, the signal ⓑ is set to H level to start the direction B movement of the lens 13 from the current position. The subsequent steps, $S_{41}$, $S_{42}$, $S_{43}$ and $S_{44}$ which are similar to the steps $S_{14}$, $S_{15}$, $S_{16}$ and $S_{13}$ are carried out to displace the lens 13 through the amount corresponding to the counter TN1 number. Thus, the lens 13 is positioned at the selected magnification position. At the termination of those steps, the sequence jumps to Ⓐ of FIG. 6A.

If the determination at step $S_{23}$ is positive, the step $S_{45}$ of FIG. 6C is executed. The lens 13 is moved in the direction A, and steps $S_{45}$, $S_{46}$, $S_{47}$, $S_{48}$, $S_{49}$, $S_{50}$, $S_{51}$, $S_{52}$ and $S_{53}$ which are similar to $S_2$, $S_3$, $S_4$, $S_5$, $S_6$, $S_7$, $S_8$, $S_9$ and $S_{10}$, respectively, are executed. By this, the lens 13 is positioned correctly at the reference position $13_4$, and simultaneously, the counter TN2 is set to the initial, i.e., 1. At step $S_{53}$, a determination is made as to whether to move the lens 13 to the $13_3$ position, and if not, a determination is made, at step $S_{55}$, as to whether to move the lens 13 to $13_2$ position. If the determination at step $S_{55}$ is negative, it is necessary to move the lens 13 to $13_1$ position, so that the number $(P_1+P_2+P_3)$ is set in the counter TN1 at the step $S_{58}$. If the determination at the step $S_{54}$ is "YES", the counter TN1 is set to $P_1$ and $(P_1+P_2)$ at the steps $S_{56}$ and $S_{57}$, respectively. And, at step $S_{59}$, the signal ⓑ is set to H level to start the lens 13 movement in B direction. Then, steps $S_{60}$, $S_{61}$, $S_{62}$ and $S_{63}$ which are similar to steps $S_{14}$, $S_{15}$, $S_{16}$ and $S_{17}$, respectively, are carried out, the lens 13 is moved from the reference position $13_4$ through the amount corresponding to the pulse number set in the counter TN1. Thus, the lens 13 is positioned at the selected magnification position. At the termination of those steps, the sequence jumps to Ⓐ of FIG. 6A.

If the jump to Ⓐ takes place after the steps $S_{34}$, $S_{44}$ and $S_{63}$, the steps $S_{18}$ and $S_{20}$ are repeated except that the magnification selector key is actuated during the movement of the lens 13. When the copy key SWC is actuated, the copy process $S_{21}$ is carried out to provide a copy at the selected magnification. If the magnification is reset to another value during the lens 13 movement, the sequence transfers to the step $S_{22}$ through the step $S_{18}$ and $S_{19}$ to effect the control operations as described hereinbefore with respect to those steps.

In the foregoing description, the lens 13 is once moved back to the reference position $13_4$ each time the lens 13 has been moved, and therefore, the magnification has been changed, predetermined plural times. However, it is a possible alternative to restore the lens 13 to the reference position $13_4$ each time the magnification changed, and then moved to the selected magnification position. To achieve this alternative, the steps $S_4$, $S_{10}$, $S_{22}$ and $S_{23}$ are deleted from the flow charts explained above (i.e., the function of counter TN2 is omitted from the microcomputer), and the determination at step $S_{19}$ is "YES", the step $S_{45}$ of FIG. 6C is directly executed.

All of the above described systems are such that the lens 13 is once moved to the reference position $13_4$ and then moved to the selected magnification position, each time the predetermined plural number of lens displacements have been carried out, or each time of lens displacement. The next embodiments are such that the lens 13 is moved back to the reference position $13_4$ and the moved to the selected magnification position, in the case that the lens 13 position is changed after a predetermined period of time has passed from a reference point of time. In this type of systems, the microcomputer shown in FIG. 5 has a function of timer T2 in place of counter TN2, and it measures by the timer T2 the time period from the point of time of the termination of lens 13 movement to the object position which is effected after the lens 13 is once moved back to the reference position $13_4$.

Figures 2, 7A:
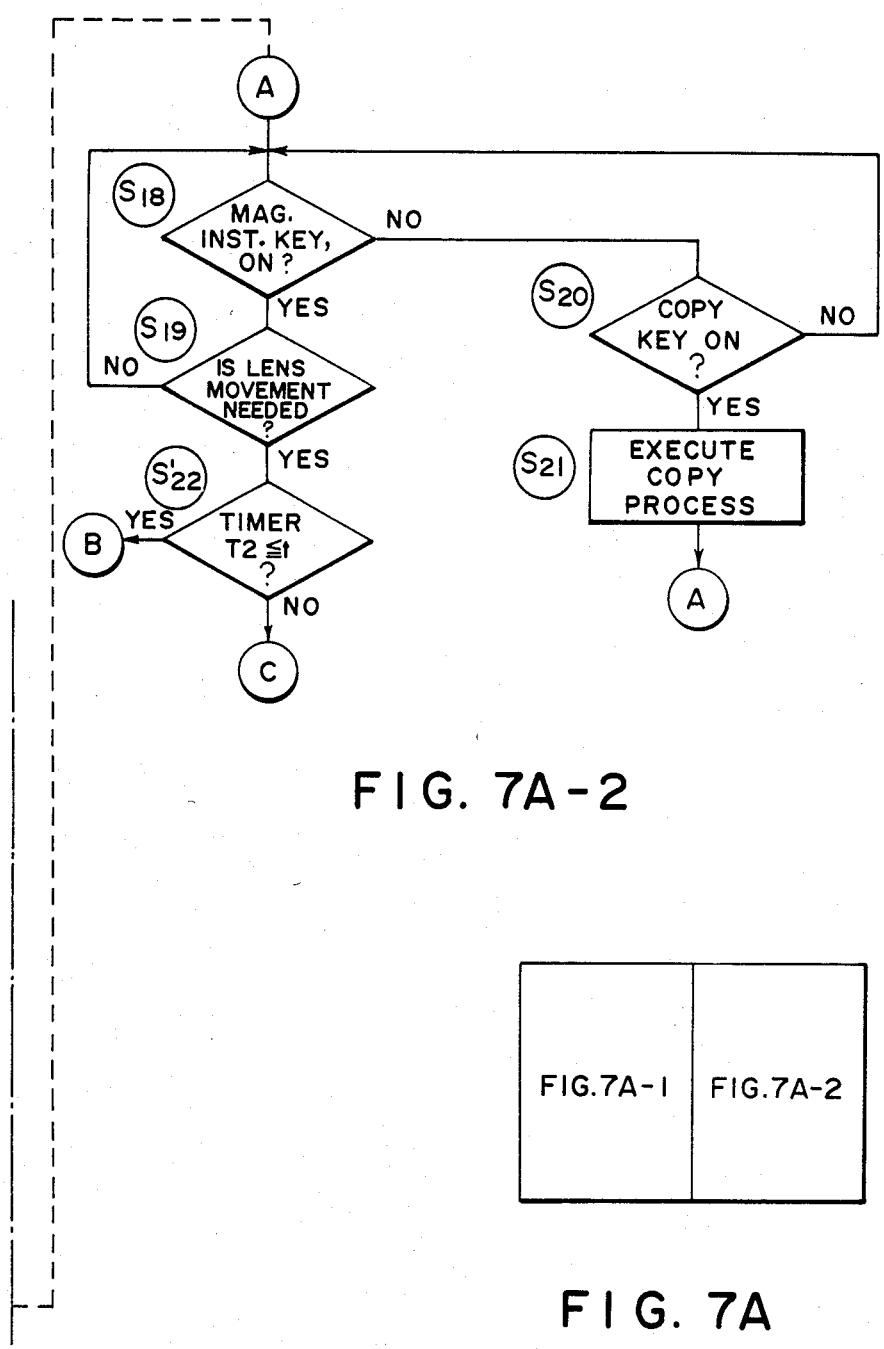
Figure 7A:
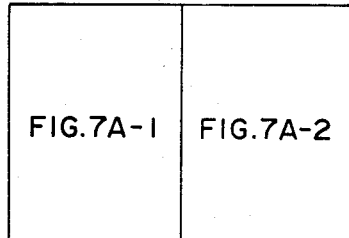
Figures 1, 7A:
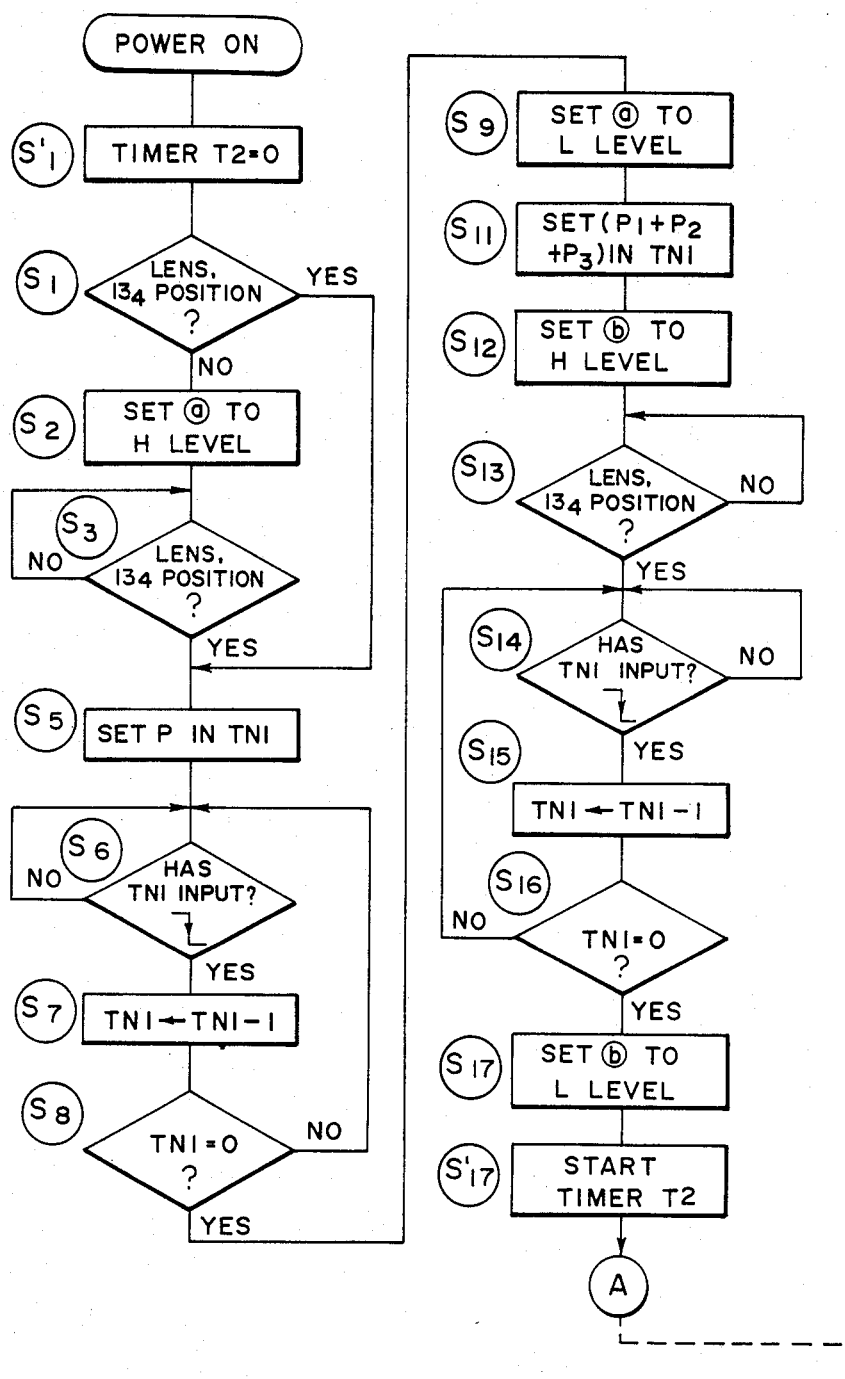
Figures 2, 7B:
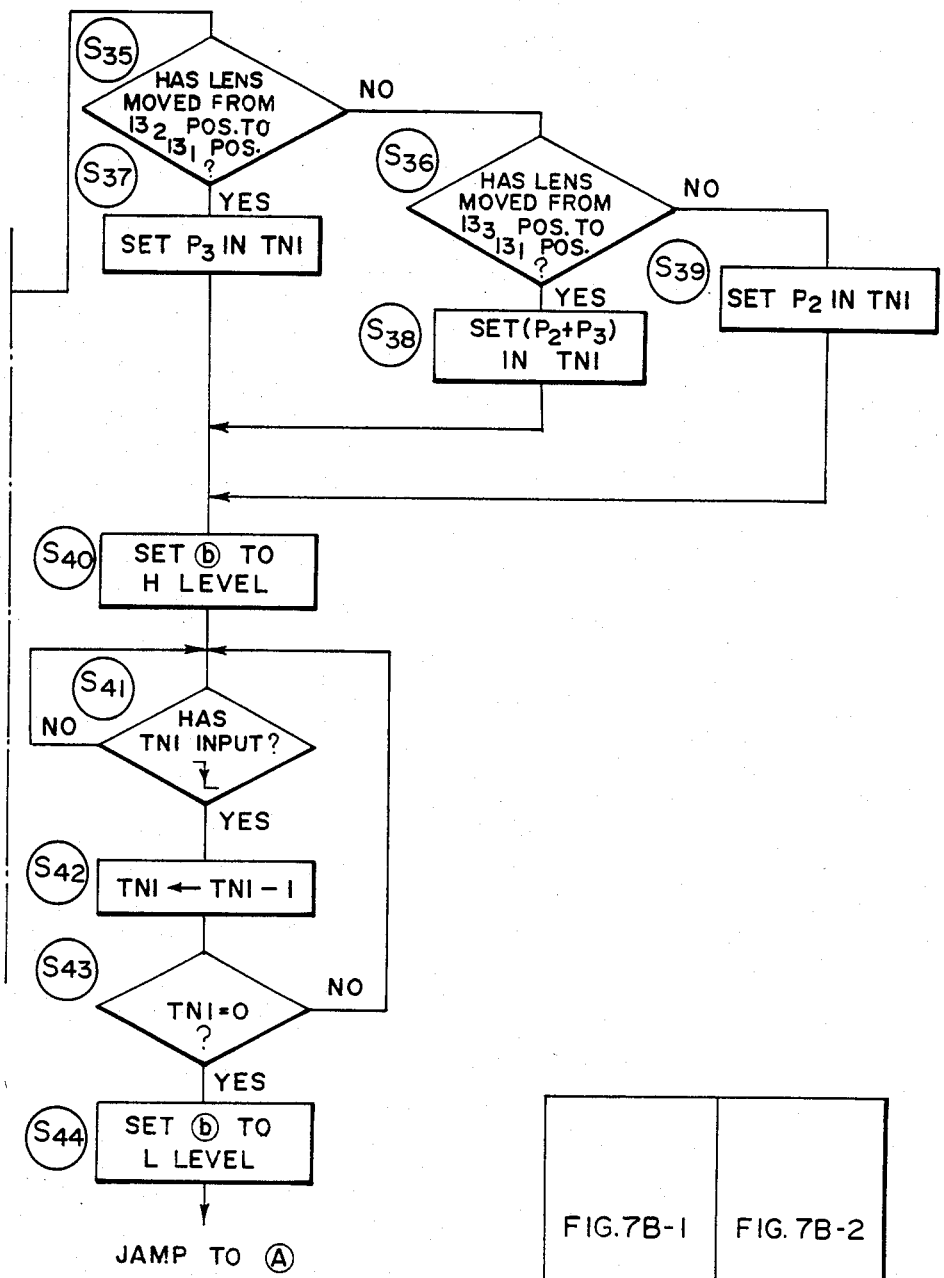
Figure 7B:
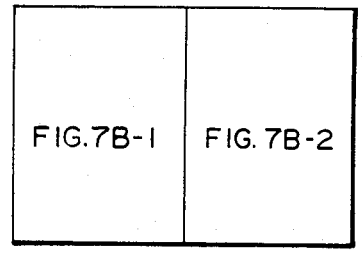
Figures 1, 7B:
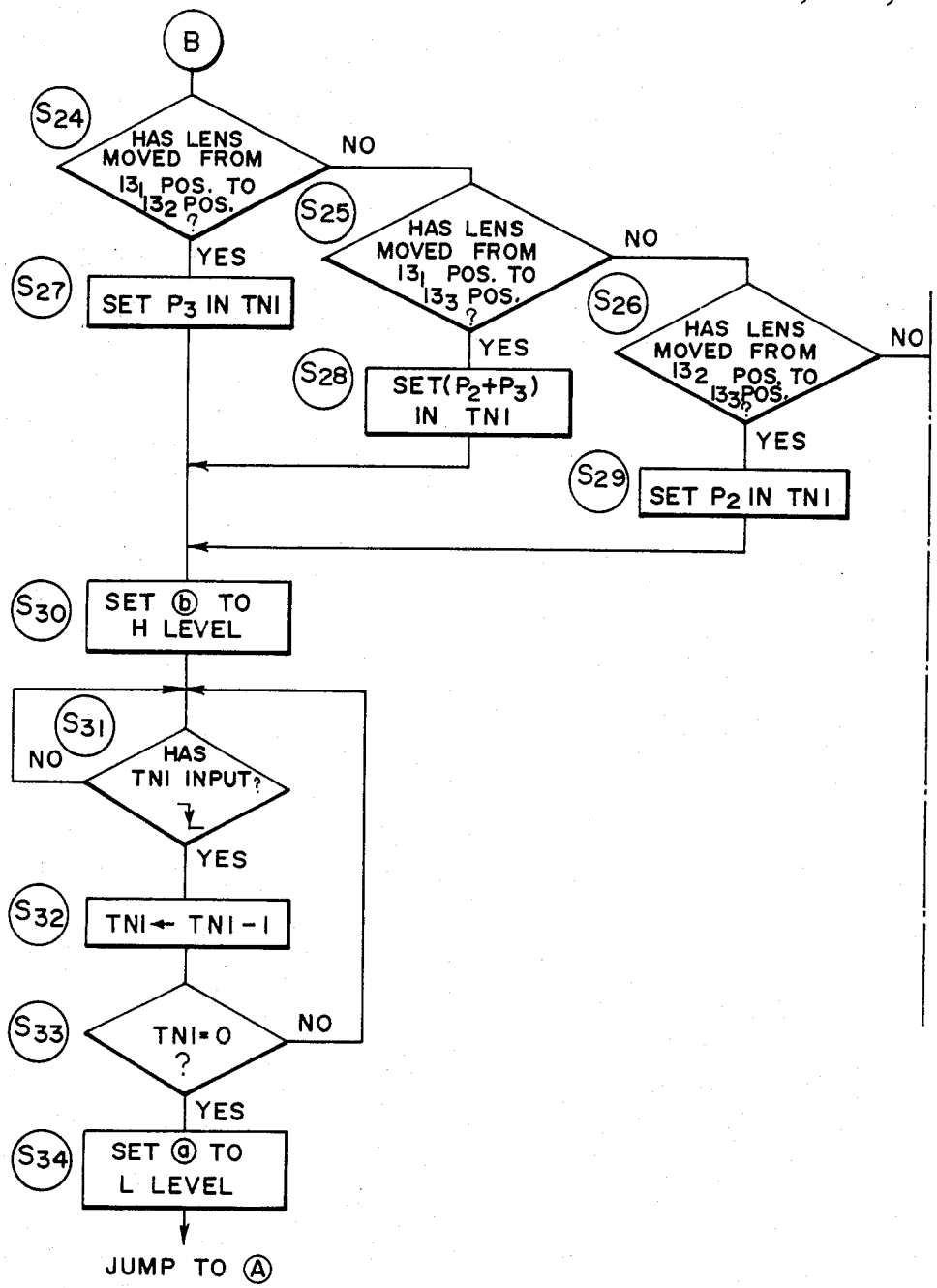
Figures 2, 7C:
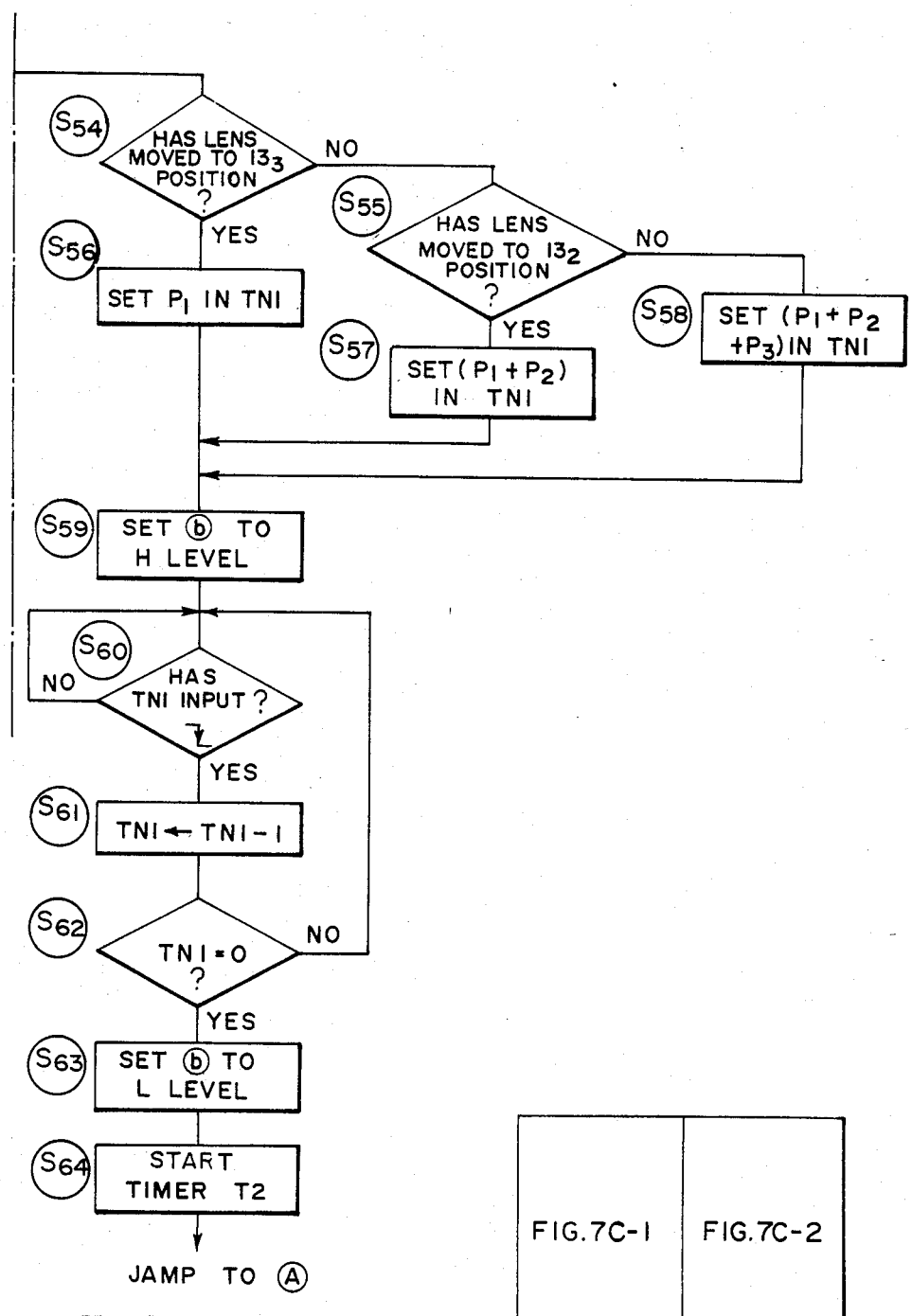
Figure 7C:
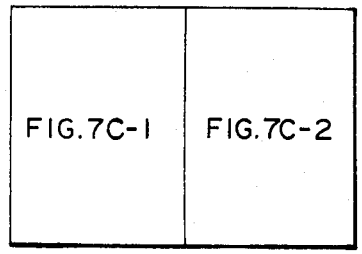
Figures 1, 7C:
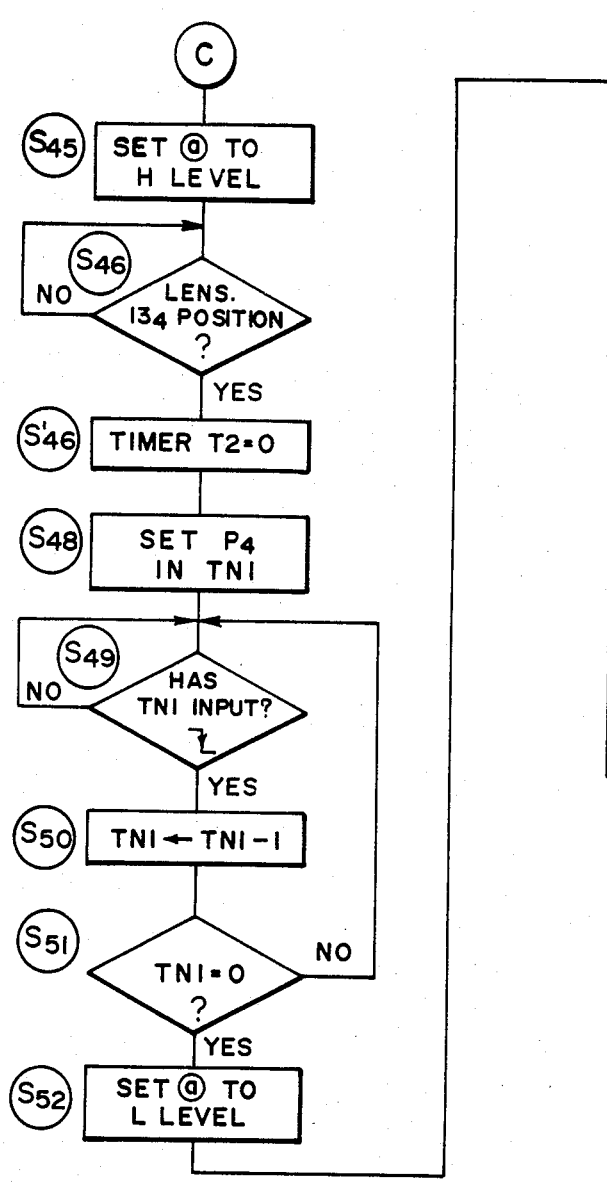

As shown in FIGS. 7A, 7B and 7C, the flow charts of this embodiment do not have the steps $S_4$, $S_{10}$, $S_{22}$, $S_{23}$, $S_{47}$ and $S_{53}$ relating to the counter TN2, and in place thereof, they have steps $S_1'$, $S_{17}'$, $S_{22}'$, $S_{46}'$ and $S_{63}'$ associated with the timer T2. In the following description, the explanation for the steps which are similar to those of FIGS. 6A, 6B and 6C embodiments, will be omitted by giving the same step No. as with those embodiments.

In FIG. 7A, when the power switch SWP is actuated (POWER ON) to supply power to the copying machine, the timer T2 is cleared at step $S_1'$. Similarly to the first embodiment, in response to POWER ON, the lens 13 is moved to the reference position $13_4$, then moved therefrom to the unit magnification position $13_1$, and then it is stopped there. Upon the termination of this action, the timer T2 starts at step $S_{17}'$.

As described above, the lens 13, responsive to the POWER ON, once moved to the reference position $13_4$, and then moved to the unit magnification position $13_1$ and stopped there (state of Ⓐ ). Therefore, if the copy key is actuated, a copy is reproduced correctly at the unit magnification.

The operator will otherwise actuate one of the magnification selector keys SW1, SW2 or SW3, as desired. Then, the microcomputer MC, at step $S_{18}$, determines whether the magnification selector key has been actuated. If not, the above described step 20 is executed, and if so, a determination is made as to whether the lens 13 is currently at the selected magnification position. If not, at step $S_{18}$, it is determined whether the magnification selector key has been actuated, but, since the input information has been used for the determination and erased, the determination at the step $S_{18}$ is negative, so that step $S_{20}$ is executed.

As described hereinbefore, at the step $S_{20}$, a determination is made whether the copy key SWC has been actuated. If so, the copy processes are carried out by the signal ⓒ. The number of copy processes corresponding to the selected number have been completed, the sequence jumps to Ⓐ. If the determination at the step $S_{20}$, the sequence returns to the step $S_{18}$. The steps $S_{18}$ and $S_{20}$ are repeated, until the next actuation of copy key SWC, or the magnification selector key is actuated.

If it is determined at the step $S_{19}$ that the lens 13 movement is necessary, the time counted by the timer T2 at the step $S_{22}'$ is compared with a predetermined time t which will be hereinafter described. If it is longer than t, the sequence transfers to the flow chart Ⓒ (FIG. 7C); and if not, the sequence transfers to Ⓑ (FIG. 7B). In the latter case, that is, if it not after the actuation of the power switch SWP or after the transfer to the flow chart Ⓒ which will be described hereinafter, it is deemed that the number of magnification changes is not large, so that the error occurring in the lens 13 displacement is not integrated to a great extent, thus not requiring that the lens 13 is returned to the reference position. Therefore, the lens 13 is moved directly to the selected magnification position. On the other hand, the time measured by the timer T2 is larger than t, it is deemed that the number of magnification changes (lens displacements) which have been executed is large enough, thus the lens 13 is once moved back to the reference position $13_4$ and then moved to the selected magnification position.

The determination at the step $S_{22}'$ is positive (YES), that is, $T2 \geq t$, the sequence shown in FIG. 7B is executed. The flow chart of this Figure is the same as that of FIG. 6B, so that the description is omitted for the simplicity of explanation.

If the determination at the step $S_{22}$ is negative (NO), that is, $T2 > t$, the sequence transfers to step $S_{45}$ to move the lens 13 in the direction of the arrow A, and then steps $S_{45}$, $S_{46}$, $S_{48}$, $S_{49}$, $S_{50}$, $S_{51}$ and $S_{52}$ are executed so that the lens is correctly at the position $13_4$, and at the same time, the timer T2 is cleared at step $S_{46}'$. The step $S_{46}'$ may be executed after the lens 13 has reached the reference position $13_4$, for example, at a certain point of time between the steps $S_{52}$ and $S_{54}$. At the step $S_{54}$, it is determined whether the lens 13 is to be moved to the position $13_3$. If not, a determination is made as to whether to move the lens 13 to the position $13_2$ at step $S_{55}$. If not, the lens 13 has to be moved to the position $13_1$ so that the number $(P_1+P_2+P_3)$ is set in the counter TN1 at step $S_{58}$. If the determination at the step $S_{54}$ is "YES", and if the determination at the step $S_{55}$ is "YES", the numbers $P_1$ and $(P_1+P_2)$ are set in the counter TN1 respectively at step $S_{56}$ and $S_{57}$. And, at step $S_{59}$, the signal ⓑ is set to H level to start the lens 13 movement from the reference position $13_4$ in the arrow B direction. Subsequently, steps $S_{60}$, $S_{61}$, $S_{62}$ and $S_{63}$ are executed, so that the lens 13 is set at a position which is distant from the reference position $13_4$ by the amount corresponding to the number set in the counter TN1, that is, the selected magnification position.

At step $S_{63}'$, the timer T2 is restarted, and the sequence jumps to Ⓐ of FIG. 7A. The step $S_{63}'$ may be carried out before the lens 13 is moved to the selected magnification position, or during it being moved, for example, at a certain point of time between steps $S_{56}$, $S_{57}$, $S_{58}$ and $S_{59}$. If the jump takes place after the steps $S_{34}$, $S_{44}$ and $S_{63}'$, the steps $S_{18}$ and $S_{20}$ are repeated except that the magnification selector key is actuated during the lens 13 movement.

In the foregoing embodiment, the lens 13 directly moves to the selected magnification position, within the predetermined time t after the actuation of the power switch SWP. But, beyond the time t, the lens 13 is once moved to the reference position $13_4$ and then moved to the selected magnification position.

This embodiment is based on the assumption that the number of the magnification changing operations is proportional to the time period after a predetermined point. That is, the integration of the positioning errors would not be so large within the time limit t, since the number of the lens 13 displacements executed would be small, but the integration would be large beyond the time limit, since the number of the lens 13 displacements executed would be also large, so that the lens 13 should be returned once to the reference position. The time period t may be made adjustable. For example, for the operator who changes the magnification relatively frequently, the time set may be 10 minute or so, while for the operator who changes the magnification relatively less frequently, the time may be set to one hour or two hours or so.

The start of the timer T2 operation may be made at the first actuation of the copy key SWC, or at the first lens 13 movement, after the actuation of the power switch SWP.

In the foregoing embodiments, an end of the lens movement is taken as the lens reference position, it may be in between the opposite ends. In this case, the stopper for stopping the lens 13 at the reference position is retractable by a solenoid or the like during the lens movement so that the lens 13 is once positioned at the reference position by inserting the stopper across the passage of the lens mount movement.

Further, in the foregoing embodiment, the reference position is not the same as any of the positions actually used for the copy operation, that is, any of the selectable magnification positions, but the reference position may be same as one of them. For example, it may be that when the lens 13 is set to position $13_4$, the copy process can be executed at a magnification $m_4$.

Further, in the foregoing embodiment, the 3 or 4 magnifications are selectable, but this may be more, and may be so much as to make possible a substantially continuous magnification change. The present invention is applicable to such cases.

Further, in the foregoing embodiment, a slit disk is used for producing a series of pulses, but other types of pulse generator may be used, such as a clock pulse generator. In this case, a pulse motor (stepping motor) actuated by the clock pulse generator.

In the foregoing embodiments, the lens 13 is controlled by energization and deenergization of the motor 29, but it may be controlled by a clutch means provided between the motor 29 and the worm gear 28.

Also, in the foregoing embodiment, a zoom lens is used for the imaging lens, but the present invention is applicable to the apparatus with a fixed focal length lens. In such a case the total optical path length between the original and the photosensitive member surface must also be changed, upon magnification change. The starting and stopping positions of the mirror 10, and/or mirrors 11 and 12, or the position of the mirror 14 are changed in accordance with the selected magnification. The present invention is applicable to the changing of such mirror positions.

Further, the present invention is applicable to the machines wherein the original table is moved for scanning the original, wherein the original is moved by transporting rollers or belt, or wherein an image of overall surface of the original is projected to the photosensitive member surface.

Furthermore, the present invention is applicable to a digital copy apparatus or facsimile apparatus, wherein an image of the original is once formed on an image-pick-up elements, such as CCD (Charge Coupled Device), to form electric signals corresponding to the original image, and a desired image is formed using the electric signals.

What is claimed is:

1. Image forming apparatus wherein an image of an original is formed on a photosensitive member surface at a variable magnification, comprising:

optical means for imaging an original on the photosensitive member surface, said optical means being displaceable to change the magnification at which the image of the original is formed on the photosensitive member surface;

pulse generating means for generating a series of pulses; and control means for controlling a position of said optical means, said control means controlling the amount of displacement of said optical means on the basis of the count of the pulses generated by said pulses generating means, and said control means effecting, each time said optical means is displaced, an action of once moving said optical means to a reference position and then moving the same to a desired position on the basis of the count.

2. Image forming apparatus wherein an image of an original is formed on a photosensitive member surface at a variable magnification, comprising:

optical means for imaging an original on the photosensitive member surface, said optical means being displaceable to change the magnification at which the image of the original is formed on the photosensitive member surface;

pulse generating means for generating a series of pulses; and control means for controlling a position of said optical means, said control means controlling the amount of displacement of said optical means on the basis of the count of the pulses generated by said generating means, and said control means effective, each time said optical means is displaced a predetermined number of times, an action of once moving said optical means to a reference position and then moving the same to a desired position on the basis of the count.

3. Image forming apparatus wherein an image of an original is formed on a photosensitive member surface at a variable magnification, comprising:

optical means for imaging an original on the photosensitive member surface, said optical means being displaceable to change the magnification at which the image of the original is formed on the photosensitive member surface;

pulse generating means for generating a series of pulses; and control means for controlling a position of said optical means, said control means controlling the amount of displacement of said optical means on the basis of the count of the pulses generated by said pulse generating means, and said control means effecting, when a predetermined period of time elapses from a predetermined reference time, an action of once moving said optical means to a reference position and then moving the same to a desired period on the basis of the count.

4. Apparatus according to claim 1, 2 or 3, further comprising power switch means for supplying power to said apparatus, wherein said control means is responsive to closing of said power switch means to once move said optical means to the reference position and then to the desired position.

5. Apparatus according to any one of claims 1, 2 or 3, wherein said optical means is a zoom lens, and said apparatus further comprising means for changing a focal length of the zoom lens in accordance with the displacement of the zoom lens.

6. Apparatus according to claim 1, 2 or 3, further comprising power switch means for supplying power to said apparatus, wherein said control means is responsive to closing of said power switch means to once move said optical means to the reference position and then to a position corresponding to a unit magnification.

7. Apparatus according to claim 1, 2 or 3, wherein the desired position corresponds to the magnification selected.

8. Apparatus according to claim 7, wherein said optical means is a zoom lens, and said apparatus further comprising means for changing a focal length of the zoom lens in accordance with the displacement of the zoom lens.

9. Image forming apparatus wherein an image of an original is formed on a photosensitive member surface at a variable magnification, comprising:

optical means for imaging an original on the photosensitive member surface, said optical means being displaceable along a predetermined path to change the magnification at which the image of the original is formed on the photosensitive member surface;

driving means for displacing said optical means, including a driving source and means for transmitting its driving force to said optical means;

pulse generating means for generating a series of pulses; and control means for controlling said driving means in accordance with the series of pulses generated by said pulse generating means, said control means controlling said driving means to once move said optical means to a reference position each time said optical means is displaced and then move said optical means through a distance corresponding to the number of pulses which corresponds to a magnification selected.

10. Image forming apparatus wherein an image of an original is formed on a photosensitive member surface at a variable magnification, comprising:

optical means for imaging an original on the photosensitive member surface, said optical means being displaceable along a predetermined path to change the magnification at which the image of the original is formed on the photosensitive member surface;

driving means for displacing said optical means, including a driving source and means for transmitting its driving force to said optical means;

pulse generating means for generating a series of pulses; and control means for controlling said driving means in accordance with the series of pulses generated by said pulse generating means, said control means, when the number of the position changes of said optical means reaches a predetermined number, controlling said driving means to once move said optical means to a reference position and then move the same through a distance corresponding to the number of pulses which corresponds to a magnification selected.

11. Image forming apparatus wherein an image of an original is formed on a photosensitive member surface at a variable magnification, comprising:

optical means for imaging an original on the photosensitive member surface, said optical means being displaceable along a predetermined path to change the magnification at which the image of the original is formed on the photosensitive member surface;

driving means for displacing said optical means, including a driving source and means for transmitting its driving force to said optical means;

pulse generating means for generating a series of pulses; and control means for controlling said driving means in accordance with the series of pulses generated by said pulse generating means, said control means, when the position of the optical means is changed after a predetermined period of time elapses from a predetermined reference time, controlling said driving means to once move said optical means to a reference position and then move the same through a distance corresponding to the number of pulses which corresponds to a magnification selected.

12. Apparatus according to any one of claims 9 through 11, further comprising stopper means for stopping said optical means at said reference position, wherein said drive force transmitting means includes torque limiter means, and wherein said control means stops the application of the driving source to said optical means which is in the direction of moving said optical means to the reference position, at a point of time which is after the arrival of said optical means to the reference position.

13. Apparatus according to claim 12, wherein said optical means is a zoom lens, and further comprising focal length changing means for changing the focal length of the zoom lens in accordance with the movement of the zoom lens.

14. Apparatus according to claim 13, wherein said focal length changing means is driven by said driving source.

15. Apparatus according to claim 14, wherein said focal length changing means includes a zooming ring associated with said zoom lens, a cam surface inclined with respect to the path of zoom lens movement, and means for operatively connecting the cam surface and the zooming ring.

16. Apparatus according to any one of claims 9 through 11, wherein said optical means is a zoom lens, and further comprising focal length changing means for changing the focal length of the zoom lens in accordance with the movement of the zoom lens.

17. Apparatus according to claim 16, wherein said focal length changing means is driven by said driving source.

18. Apparatus according to claim 17, wherein said focal length changing means includes a zooming ring associated with said zoom lens, a cam surface inclined with respect to the path of zoom lens movement, and means for operatively connecting the cam surface and the zooming ring.

19. Apparatus according to claim 17, further comprising power switch means for supplying power to said apparatus, wherein said control means is responsive to closing of said power switch means to once move said optical means to the reference position and then to the desired position.

20. Apparatus according to claim 17, further comprising power switch means for supplying power to said apparatus, wherein said control means is responsive to closing of said power switch means to once move said optical means to the reference position and then to a position corresponding to a unit magnification.

* * * * *

UNITED STATES PATENT AND TRADEMARK OFFICE
CERTIFICATE OF CORRECTION

PATENT NO. : 4,521,100

DATED : June 4, 1985

INVENTOR(S) : TAKAJI YONEMORI, ET AL.

It is certified that error appears in the above-identified patent and that said Letters Patent is hereby corrected as shown below:

Col. 3, line 16, delete "(1" after "$1_2$".

Col. 6, line 15, change "hall" to --Hall--;
     line 18, change "hall" to --Hall--;
     line 41, insert --load-- after "predetermined";
     line 48, insert --load-- after "predetermined".

Col. 7, line 60, delete "be" (first occurrence).

Col. 8, line 54, insert --be-- before "NO";
     line 58, place circle around "c";
     line 66, change "upto" to --up to--.

Col. 10, line 40, change "134" to --$13_4$--.

Col. 12, line 28, change "minute" to --minutes--.

Signed and Sealed this

Twenty-seventh Day of May 1986

[SEAL]

Attest:

DONALD J. QUIGG

Attesting Officer      Commissioner of Patents and Trademarks